United States Patent de Rubinat

[15] 3,701,053

[45] Oct. 24, 1972

[54] PROCESS AND APPARATUS FOR TRANSMISSION OF BINARY MESSAGES BY SYNCHRONIZED FREQUENCY SHIFT KEYING

[72] Inventor: Jean-Marie de Rubinat, Mont-sur-Marchienne, Belgium

[73] Assignee: Ateliers de Constructions Electriques de Charleroi (ACEC), Charleroi, Belgium

[22] Filed: March 17, 1971

[21] Appl. No.: 125,307

[30] Foreign Application Priority Data

March 18, 1970 Belgium........................86557

[52] U.S. Cl. .....................332/9 T, 178/66, 325/163, 332/16 T, 332/23

[51] Int. Cl. .............................................H04l 27/12

[58] Field of Search.......332/9, 9 T, 16, 16 T, 17, 23; 325/163, 30; 178/66, 67, 88

[56] References Cited

UNITED STATES PATENTS

| | | | |
|---|---|---|---|
| 3,190,958 | 6/1965 | Bullwinkel et al. | ....325/163 X |
| 3,454,718 | 7/1969 | Perreault | ...............325/163 X |

OTHER PUBLICATIONS

Connors, " FSK Transmission System with Data Synchronized to Shift Frequency" IBM Tech. Disclosure Bulletin vol. 7 No. 9 Feb. 1965 p. 778.

*Primary Examiner*—Alfred L. Brody
*Attorney*—Raymond A. Robic

[57] ABSTRACT

A process for frequency modulation of binary messages in which the variables 0 and 1 are represented by signals of respective frequencies $f_0$ and $f_1$ differing by frequency $\Delta f$. The process is characterized in that, to prevent undesirable phase modulation during the switching from one frequency to the other, frequency $f_1$ is related to frequency $f_0$ by deriving the signal of frequency $f_1$ from a carrier wave form at the frequency $f_0$ through modulation of such frequency $f_0$ to obtain a single sideband by means of a signal of frequency $\Delta f$ which determines the rate of the switching intervals of the binary message. The apparatus comprises a first generator providing a carrier wave form of frequency $f_0$, a first phase shifting circuit providing two first signals of frequency $f_0$ shifted by 90°, a second generator providing a signal of frequency $\Delta f$, a second phase shifting circuit providing two second signals phased 90° from each other, two modulators for amplitude modulating the two first signals by the two second signals respectively, an adding circuit for adding the outputs of said two modulators and having means for suppressing one of the sidebands and the carrier waveform so as to generate a signal of frequency $f_1$, an electronic switching means operated at the frequency $\Delta f$ or a submultiple thereof for switching the signals of frequencies $f_0$ and $f_1$ in accordance with the message to be transmitted.

2 Claims, 3 Drawing Figures

PATENTED OCT 24 1972 3,701,053

INVENTOR
Jean-Marie de RUBINAT

ATTORNEY

INVENTOR
Jean-Marie de RUBINAT

ATTORNEY

PROCESS AND APPARATUS FOR TRANSMISSION OF BINARY MESSAGES BY SYNCHRONIZED FREQUENCY SHIFT KEYING

This invention relates to a process and an apparatus for frequency modulation of binary messages.

In the transmission of binary messages, it is commonly known to use signals of different frequencies $f_0$ and $f_1$, representing respectively the binary variables 0 and 1. When such signals are provided by separate generators, the relative phase of the signals varies in an undetermined fashion at the time of switching from one generator to the other. There is thus produced a phase modulation which hinders the spectrum of the frequencies used and may cause pertubations.

It is an object of the present invention to eliminate the above mentioned undesirable phase modulation by providing a switching in which the relative phase of the signals does not change.

When the frequency of a sinusoidal oscillation goes suddenly without phase discontinuity from the value $f_0$ to the value $f_1 = f_0 + \Delta f$, taking as a time origin the switching moment, the signal obtained is:

$$e_1(t) = E_0 \cos 2\pi (f_0 t + \Delta f t)$$

starting from time $t=0$.

If it is desired to prevent any phase discontinuity at the time of the return of the signal at frequency $f_0$, it is necessary to wait until the signal $e_1(t)$ is in phase with the signal $e_0(t) = E_0 \cos 2\pi f_0 t$, which happens at the time $T = 1/\Delta f$. By passing from one frequency to the other at the speed $\Delta f$, it is then possible to prevent the phase discontinuities.

In accordance with the invention, the frequency $f_1$ is related to the frequency $f_0$ by deriving the signal of frequency $f_1$ from a carrier wave form at frequency $f_0$ through modulation of such carrier to obtain a single sideband signal by means of a signal of frequency $\Delta f$ which determines the rate of the transition moments of the binary message.

The apparatus, in accordance with the invention, comprises a first generator providing a carrier wave of frequency $f_0$, a first phase shifting circuit providing two first signals of frequency $f_0$ shifted from each other by 90°, a second generator providing a signal of frequency $\Delta f$, a second phase shifting providing two second signals of frequency $\Delta f$ shifted from each other by 90°, a second generator for amplitude modulation of the two first signals by the two second signals respectively, an adding circuit for adding the outputs of the two modulators, means forming part of such modulators for suppressing one sideband and the carrier wave so as to obtain a signal of frequency $f_1$, and an electronic switching device operated at the frequency $\Delta f$ or at a submultiple thereof to switch the signals of frequencies $f_0$ and $f_1$ depending upon the message to be transmitted.

The invention will now be disclosed with reference to a preferred embodiment thereof and to the accompanying drawings in which:

FIG. 1 illustrates an example of phase modulation after a time interval T of the generation of the signal of frequency $f_0$ which is followed by the signal of frequency $f_1$.

FIG. 2 illustrates an example wherein no phase modulation is generated at the time of switching from frequency $f_0$ to frequency $f_1$.

Figure 1:
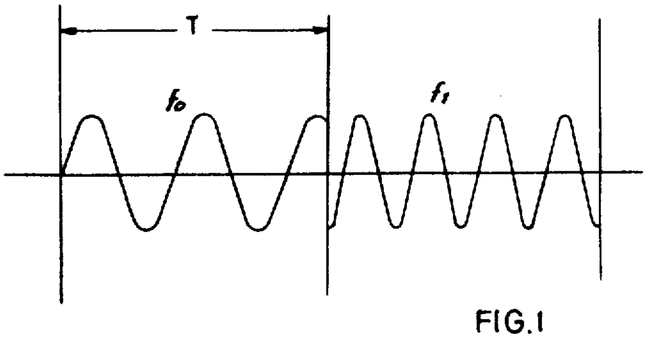
FIG. 1 illustrates two signals of frequencies $f_0$ and $f_1$ representing the binary variables 0 and 1 respectively, wherein phase modulation occurs at the time of switching from frequency $f_0$ to frequency $f_1$.
Figure 2:
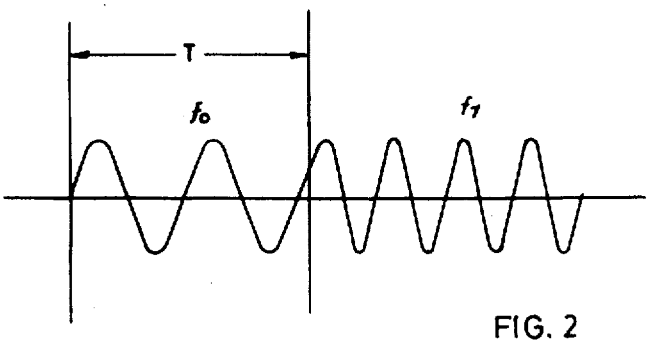
FIG. 2 illustrates the same signals at frequencies $f_0$ and $f_1$ respectively, wherein no phase modulation occurs at the time of switching from one frequency to the other.
Figure 3:
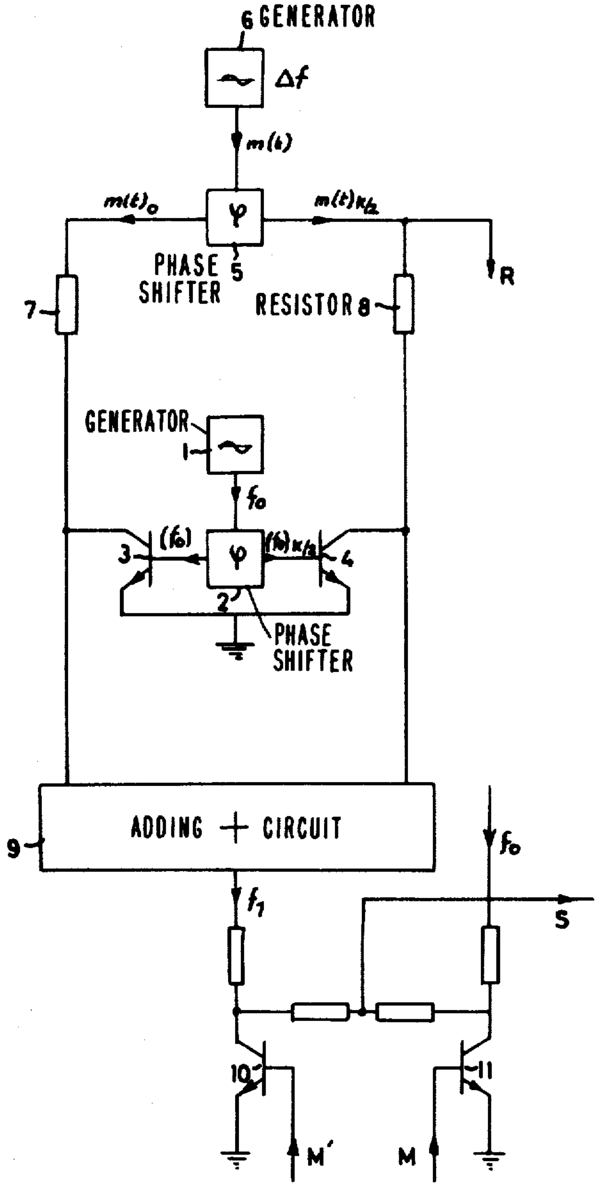
FIG. 3 illustrates a circuit for preventing the phase modulation of FIG. 1 and providing a switching from one frequency to the other, such as illustrated in FIG. 2.

FIG. 3 illustrates a preferred embodiment of a circuit for the transmission of binary messages using two frequencies $f_0$ and $f_1$ representing respectively the logic variables 0 and 1. Such a circuit comprises a generator 1 providing a signal of frequency $f_0$ which is applied to a phase shifter 2 providing two signals $(f_0)$ and $(f_0)\,\pi/2$ of frequency $f_0$ shifted from each other by $\pi/2$ radians. These two signals are applied to two modulators equipped respectively with transistors 3 and 4 which amplitude modulate by multiplication the signals $(f_0)$ and $(f_0)$ $(\pi/2)$ by the signals $m(t)_0$ and $m(t)\ \pi/2$ of frequency $\Delta f = f_1 - f_0$, shifted between each other by an angle $\pi/2$. The last mentioned signals are generated by a phase shifting circuit 5 fed by a generator 6. These signals are applied to the collectors of transistors 3 and 4 through respective resistors 7 and 8.

The signals at the collectors of transistors 3 and 4 are applied to an adding circuit 9. It may be demonstrated that the output of adding circuit 9 may, in such conditions, generate a signal containing the upper sideband only of the carrier wave at frequency $f_0$ modulated at the frequency $\Delta f$, and wherein the carrier wave is suppressed. There is so obtained a signal of frequency $f_0 + \Delta f$, that is of frequency $f_1$. The signals of frequencies $f_0$ and $f_1$ are applied to an inverter equipped with transistors 10 and 11 controlled respectively, at the frequency $\Delta f$ or a submultiple thereof, according to the binary message M to be transmitted or its complement M'. The inverter provides an output signal $s$ which is used for the transmission of the message. It may be easily understood that, from what has been said before, the switching from one frequency to the other may be done without phase modulation. Such switching is done at the passage to zero of the signal $m(t)\ \pi/2$ which provides the signals R determining the rate of the succession of the transition moments of the binary message.

In the case in which a rate of succession of the transition moments of the binary message would be equal to half the inverse of frequency $\Delta f$, there would be obtained each time a phase inversion which could be used to realize a transmission by phase modulation at 180°. However, a discriminator must be used for generating a phase opposite to the phase detected one time out of two, and it is for each of the two frequencies.

I claim:

1. Process for transmission of binary messages by frequency shift keying synchronized with the transitions of the messages, whereby the two frequencies used are tied together by using single sideband modulation of a carrier wave in order to avoid undesirable phase modulation, comprising the step of selecting respectively, for the two frequencies, the carrier wave and one of the two sidebands of said carrier wave modulated by a signal having a frequency equal to the difference of said two frequencies.

2. In an apparatus for transmission of binary messages by frequency shift keying synchronized with the transitions of the messages, including a carrier wave generator, a low frequency signal generator for modulating said carrier wave, and means responsive to said carrier wave generator and to said low frequency signal generator for generating one single sideband signal, the improvement comprising means for switching, at the output terminals of such apparatus, said carrier wave and said single sideband signals according to the data of the message to be transmitted, and means for operating said switching means at the rate of said low frequency signal.

* * * * *